United States Patent
Renno et al.

(10) Patent No.: US 7,996,659 B2
(45) Date of Patent: Aug. 9, 2011

(54) MICROPROCESSOR INSTRUCTION THAT ALLOWS SYSTEM ROUTINE CALLS AND RETURNS FROM ALL CONTEXTS

(75) Inventors: Erik K. Renno, Trondheim (NO); Oyvind Strom, Trondheim (NO); Andreas Engh-Halstvedt, Trondheim (NO); Havard Skinnemoen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 54 days.

(21) Appl. No.: 11/145,613

(22) Filed: Jun. 6, 2005

(65) Prior Publication Data

US 2007/0006200 A1    Jan. 4, 2007

(51) Int. Cl.
*G06F 9/00* (2006.01)

(52) U.S. Cl. ........... 712/229; 712/228; 712/220; 712/43

(58) Field of Classification Search .................. 712/220, 712/228, 229, 43; 717/162
See application file for complete search history.

(56) References Cited

U.S. PATENT DOCUMENTS

| | | | |
|---|---|---|---|
| 4,814,976 A | 3/1989 | Hansen et al. | 711/201 |
| 4,918,653 A | 4/1990 | Johri et al. | 364/900 |
| 5,003,466 A | 3/1991 | Schan, Jr. et al. | 364/200 |
| 5,063,499 A | 11/1991 | Garber | 395/500 |
| 5,109,329 A | 4/1992 | Strelioff | 395/725 |
| 5,347,634 A | 9/1994 | Herrell et al. | 395/250 |
| 5,418,956 A * | 5/1995 | Willman | 711/206 |
| 5,485,409 A | 1/1996 | Gupta et al. | 395/186 |
| 5,495,614 A | 2/1996 | Brent et al. | 395/700 |
| 5,680,584 A | 10/1997 | Herdeg | 395/500 |
| 5,742,825 A * | 4/1998 | Mathur et al. | 719/329 |
| 5,948,097 A * | 9/1999 | Glew et al. | 712/220 |
| 5,950,221 A | 9/1999 | Draves et al. | 711/100 |
| 5,987,557 A | 11/1999 | Ebrahim | 710/200 |
| 6,044,157 A * | 3/2000 | Uesaka et al. | 380/201 |
| 6,175,916 B1 * | 1/2001 | Ginsberg et al. | 712/228 |
| 6,272,519 B1 * | 8/2001 | Shearer et al. | 718/104 |
| 6,282,621 B1 * | 8/2001 | Parsons | 711/170 |
| 6,314,471 B1 | 11/2001 | Alverson et al. | 710/5 |
| 6,349,355 B1 | 2/2002 | Draves et al. | 711/6 |
| 6,378,068 B1 * | 4/2002 | Foster et al. | 713/1 |
| 6,397,242 B1 | 5/2002 | Devine et al. | 709/1 |
| 6,405,312 B1 * | 6/2002 | Ly | 713/155 |
| 6,785,883 B1 * | 8/2004 | Slomak | 717/128 |
| 7,082,600 B1 * | 7/2006 | Rau et al. | 717/148 |
| 7,086,048 B1 * | 8/2006 | Rau et al. | 717/164 |

(Continued)

FOREIGN PATENT DOCUMENTS

WO    WO-2006132807 A2    12/2006

OTHER PUBLICATIONS

James L. Turley, "Advanced 80386 programming techniques"; Osborne/McGraw-Hill; Year of Publication 1988; Chapter 3, pp. 1-32.*

Primary Examiner — Idriss N Alrobaye
(74) Attorney, Agent, or Firm — Fish & Richardson P.C.

(57) ABSTRACT

An apparatus comprises register means for storing a return context upon initiation of a supervisor call instruction and restoring means to restore a privilege level and status register upon execution of a supervisor return instruction. The supervisor call instruction can be called from all contexts.

6 Claims, 5 Drawing Sheets

U.S. PATENT DOCUMENTS

| | | | |
|---|---|---|---|
| 7,191,322 B2 * | 3/2007 | Millward et al. | 713/1 |
| 7,275,246 B1 * | 9/2007 | Yates et al. | 718/100 |
| 7,281,102 B1 * | 10/2007 | Agesen et al. | 711/163 |
| 7,475,398 B2 * | 1/2009 | Nunoe | 718/104 |
| 2002/0108028 A1 * | 8/2002 | Nunoe | 712/233 |
| 2003/0101322 A1 | 5/2003 | Gardner | 711/163 |
| 2004/0034875 A1 * | 2/2004 | Bulkowski et al. | 725/136 |
| 2004/0078795 A1 | 4/2004 | Alverson et al. | 718/100 |
| 2004/0122834 A1 * | 6/2004 | Durrant | 707/100 |
| 2004/0230779 A1 * | 11/2004 | Haghighat et al. | 712/234 |
| 2005/0066332 A1 * | 3/2005 | Durai | 718/108 |
| 2005/0091652 A1 * | 4/2005 | Ross et al. | 718/1 |
| 2005/0147046 A1 * | 7/2005 | Boudou et al. | 370/241 |
| 2006/0026406 A1 * | 2/2006 | Gardner | 712/228 |

* cited by examiner

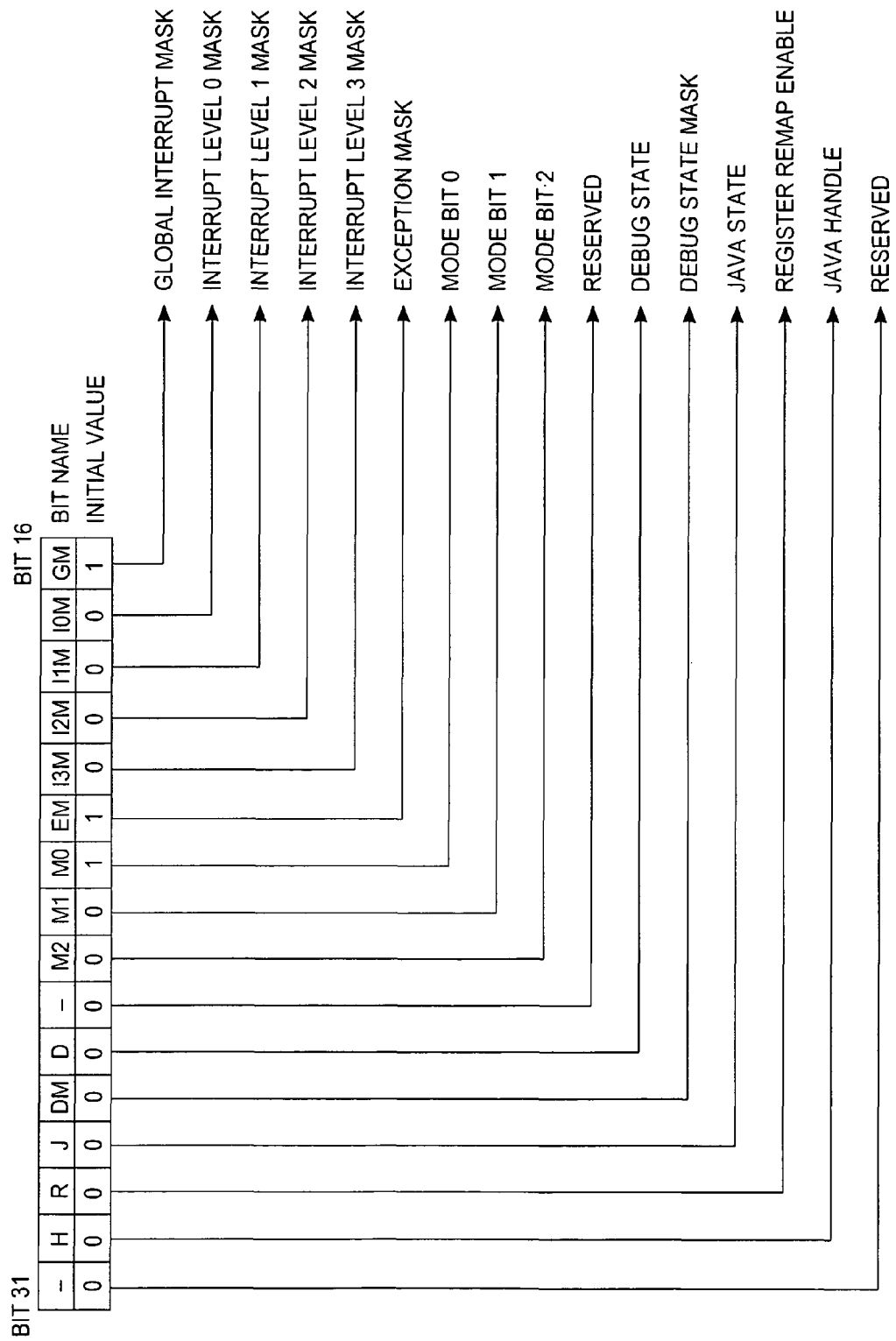
Fig. _ 1A

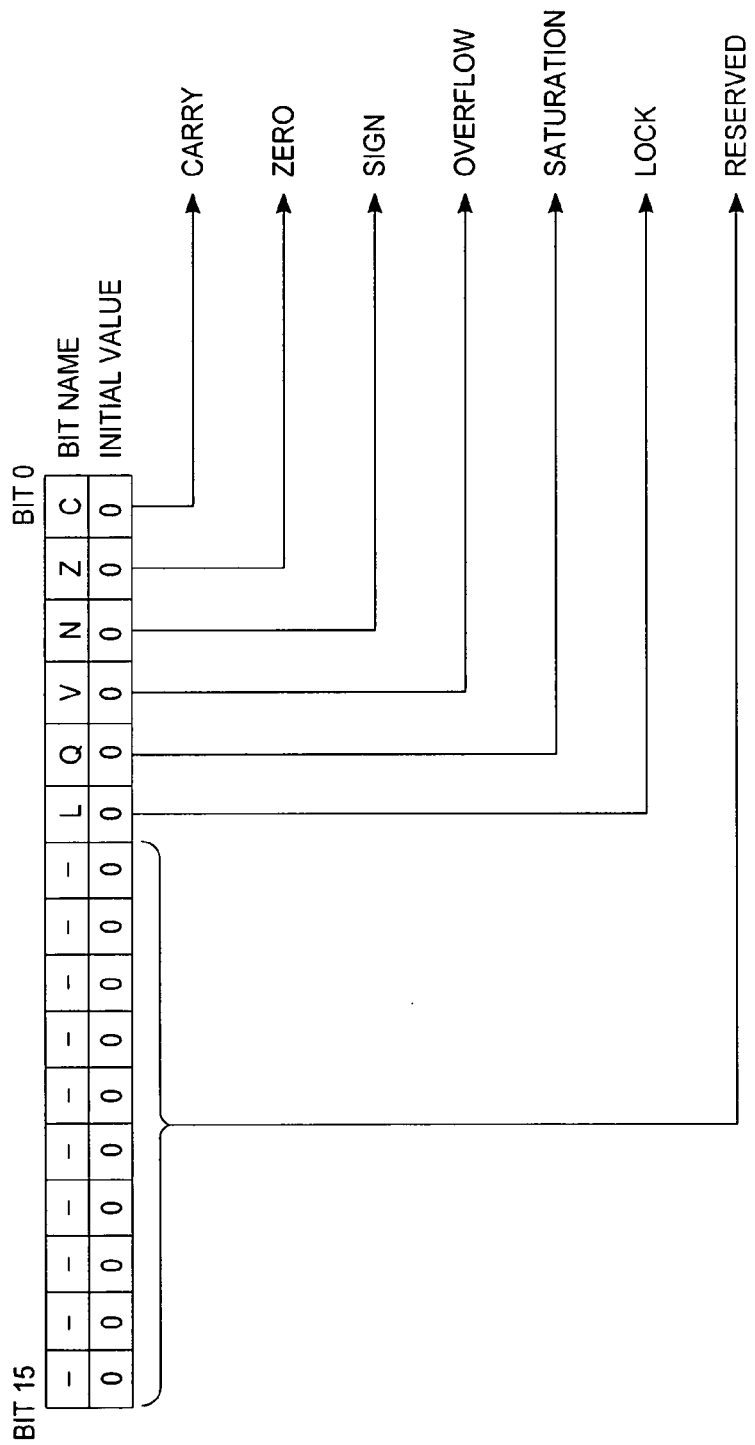
Fig. _ 1B

SCALL OPERATION

| INST# | INSTRUCTION | DESCRIPTION |
|---|---|---|
| 401: | IF ( SR[M2:M0] == {B'000 OR B'001} ) | CHECK CALLING MODE |
| 402: | IF ( MICROARCHITECTURE == AVR32A) | CHECK MICROARCHITECTURE |
| 403: | *(–SP$_{SYS}$) ← PC + 2; | INCR PC; STORE ON SYSTEM STACK |
| 404: | *(–SP$_{SYS}$) ← SR; | STORE STATUS ON SYSTEM STACK |
| 405: | PC ← EVBA + 0x100; | MOVE HANDLER ADDR TO PC |
| 406: | SR[M2:M0] ← B'001; | SET EXECUTION STATUS TO PRIVILEGED |
| | ELSE | IF NOT AVR32A, DO INSTR 7-9 |
| 407: | RAR$_{SUP}$ ← PC + 2; | INCR. PC; STORE IN RET. ADDR. REG. |
| 408: | RSR$_{SUP}$ ← SR; | MOVE STATUS REG CONTENTS TO RSR |
| 409: | PC ← EVBA + 0x100; | MOVE HANDLER ADDR TO PC |
| 410: | SR[M2:M0] ← B'001; | SET EXECUTION STATUS TO PRIVILEGED |
| | ELSE | |
| 411: | LR$_{CURRENT\ CONTEXT}$ ← PC + 2; | INCR. PC; STORE IN LINK REGISTER |
| 412: | PC ← EVBA + 0x100; | MOVE HANDLER ADDR TO PC |

*Fig. 4*

RETS OPERATION

| INST# | INSTRUCTION | DESCRIPTION |
|---|---|---|
| 501: | IF ( SR[M2:M0] == B'000 ) | CHECK PRIVILEGE LEVEL |
|  |     ISSUE PRIVILEGE VIOLATION EXCEPTION; |  |
|  | ELSE IF ( SR[M2:M0] == B'001) |  |
| 502: |     IF (MICROARCHITECTURE == AVR32A) | CHECK MICROARCHITECTURE |
| 503: |         SR ← *(SP$_{SYS}$++) | RESTORE SR FROM SYS. STACK |
| 504: |         PC ← *(SP$_{SYS}$++) | RESTORE PC FROM SYS. STACK |
|  |     ELSE | IF NOT AVR32A, DO INSTR 5,6 |
| 505: |         SR ← RSR$_{SUP}$; | RESTORE SR FROM RET. STATUS REG. |
| 506: |         PC ← RAR$_{SUP}$; | RESTORE PC FROM RET. ADDR. REG |
|  | ELSE |  |
| 507: |     PC ← LR CURRENT CONTEXT | RESTORE PC FROM LINK REGISTER |

*Fig. _ 5*

MICROPROCESSOR INSTRUCTION THAT ALLOWS SYSTEM ROUTINE CALLS AND RETURNS FROM ALL CONTEXTS

TECHNICAL FIELD

The present invention is related to computer systems, and more specifically relates to a microprocessor providing support for an operating system (OS) with an instruction allowing a system routine to be called from any context.

BACKGROUND ART

Modern microprocessors use operating systems in order to control and distribute system resources to application programs and processes. Application programs typically run in an unprivileged mode in which they only have restricted access to system resources. The operating system (OS) runs in a privileged mode, where all resources are available.

When application programs require intervention by the operating system, they pass control to the operating system by means of an operating system call, also referred to as a system call or a supervisor call (SCALL). As an example, an application may require access to a resource controlled by the operating system, such as a peripheral. In order to use the peripheral, the application must request that the operating system perform the access task on its behalf. This request is performed by the system call.

In some situations, the operating system may require use of the peripheral on its own behalf. Those skilled in the art will appreciate that it would be beneficial if the same mechanisms for calling the peripheral control routine could be used from the operating system itself. Use of these same mechanisms would enable both an application program and the operating system to use the same library functions to access peripherals and other privileged resources. Otherwise, different library functions would be required; for example, one for performing the access from the application program and one for performing the access from the operating system.

Many microprocessors provide mechanisms for calling system routines from an unprivileged mode and returning from the system routine back to the unprivileged mode. What is needed is a method allowing a system routine to be called from any context, both an unprivileged mode and a privileged mode, with execution resuming in the mode from which the system routine was called upon completion of the called system routine.

SUMMARY OF THE INVENTION

The present invention presents a method and a mechanism for calling system routines and returning from system routines. This method and mechanism can be used regardless of the context or privilege level from which the system call was performed. The present invention allows a system routine to be called from any context, comprising both unprivileged modes and privileged modes. This facilitates sharing of code between different execution modes. When the called system routine has completed, execution resumes in the mode from which the system routine was called. This does not have to be an unprivileged mode.

The methods embodied in and various features of the present invention are presented for an exemplary embodiment incorporated in the Atmel® AVR32 32-bit RISC processor core, a commercial product.

The AVR32 implements a stack which can be used for the purpose of storing a return address, status register (SR), and information about the privilege level and context of a system call. The stack saves the information in a manner which permits nesting of system calls. The AVR32 is available with two microarchitecture configurations: an AVR32A microarchitecture and an AVR32B microarchitecture. The AVR32A lacks a dedicated return address register (RAR) and lacks a dedicated return status register (RSR); these data are stored on a system stack. The AVR32B has dedicated RAR and RSR registers, so the system stack is not used to store these data. This microarchitecture difference between the AVR32A and the AVR32B results in differences in the pseudocode for the supervisor call (SCALL) and the return from supervisor call instruction (RETS), to be explained in detail infra.

The system call mechanism is designed so that a minimal execution cycle overhead is experienced when performing supervisor routine calls from time-critical event handlers. Execution of a system routine called by the system call usually requires a change in program flow and setting the processor core to a privileged mode, if the system routine was called from an unprivileged application mode. When returning from a system call, the information saved on the stack is used to return execution to the calling context. This calling context does not have to be an unprivileged mode. In order to allow the system call routine to return to the correct context, a return from supervisor call instruction (RETS) is implemented.

The AVR32 supports several different execution contexts as shown in the following table:

| Execution Contexts | | | |
| --- | --- | --- | --- |
| Priority | Mode | Security | Description |
| 1 | Non Maskable Interrupt | Privileged | Non maskable high priority interrupt mode |
| 2 | Exception | Privileged | Execute exceptions |
| 3 | Interrupt 3 | Privileged | General purpose interrupt mode |
| 4 | Interrupt 2 | Privileged | General purpose interrupt mode |
| 5 | Interrupt 1 | Privileged | General purpose interrupt mode |
| 6 | Interrupt 0 | Privileged | General purpose interrupt mode |
| N/A | Supervisor | Privileged | Runs supervisor calls |
| N/A | Application | Unprivileged | Normal program execution mode |

Mode changes can be made under software control, can be caused by external interrupts, or can be caused by exception processing. A mode can be interrupted by a higher priority mode, but not by one with lower priority. Nested exceptions can be supported. When running an operating system on the AVR32, user processes will typically execute in the application mode. The programs executed in this mode are restricted from executing certain instructions. Furthermore, most system registers together with an upper halfword of a status register cannot be accessed. Protected memory areas are also not available. All other operating modes are privileged and are collectively called System Modes. They have full access to all privileged and unprivileged resources.

The AVR32 status register (SR) is split into two halfwords, comprising an upper halfword and a lower half word. With reference to FIG. 1A, a diagram of bit allocations in the upper halfword of the status register (SR), the upper halfword contains information about the mode and state of processor execution. Of particular interest are a Mode Bit 0, a Mode Bit 1, and a Mode Bit 2. These bits convey the execution mode of the processor, according to the following table:

| Mode bit settings | | | |
|---|---|---|---|
| M2 | M1 | M0 | Mode |
| 1 | 1 | 1 | Non Maskable Interrupt |
| 1 | 1 | 0 | Exception |
| 1 | 0 | 1 | Interrupt Level 3 |
| 1 | 0 | 0 | Interrupt Level 2 |
| 0 | 1 | 1 | Interrupt Level 1 |
| 0 | 1 | 0 | Interrupt Level 0 |
| 0 | 0 | 1 | Supervisor |
| 0 | 0 | 0 | Application |

With reference to FIG. 1B, a diagram of bit allocations in the lower halfword of the status register (SR), the lower halfword comprises a carry flag (C), a zero flag (Z), a sign flag (N), an overflow flag (V), a saturation flag (Q), and a lock flag (L).

With reference to the Execution contexts and the Mode bit settings tables, supra, all modes except the application mode (mode bits=000) are privileged. If a system call is executed from the application mode, the mode bits must be set to supervisor mode (mode bits=001) in order to execute in a privileged mode. If a system call is executed from any other mode, the mode bits are unchanged since the system is already in a privileged mode. When performing a system call, sufficient information is stored to enable a return to the calling context. When a system call is executed from modes 2 through 7, the context is not changed, so it is not necessary to store information concerning the calling context. Therefore, the status register (SR) is not stored for these calls.

System calls executed from modes 2 through 7 store a return address to a link register (LR); the return from supervisor call instruction (RETS) copies the contents of the link register (LR) into the program counter (PC) in order to perform the return. Therefore, a supervisor call (SCALL) instruction and return from supervisor call instruction (RETS) executed from modes 2 through 7 behave analogously with normal call and return instructions.

When a supervisor call (SCALL) instruction is executed from the application mode (mode bits=000) or the supervisor mode (mode bits=001), it is necessary to store information identifying the calling mode, since a subsequent return from supervisor call instruction (RETS) must correctly return to the calling mode. A supervisor call (SCALL) from the application mode will set the mode bits to the supervisor mode; a supervisor call (SCALL) from the supervisor mode will remain in the supervisor mode.

BRIEF DESCRIPTION OF THE DRAWINGS

FIG. 1A is a diagram of bit allocations in an upper halfword of a status register (SR) according to an exemplary embodiment of the present invention.

FIG. 1B is a diagram of bit allocations in a lower halfword of a status register (SR) according to an exemplary embodiment of the present invention.

FIG. 4 is a code sequence for a supervisor call (SCALL) instruction according to an exemplary embodiment of the present invention.

FIG. 5 is a code sequence for a return from supervisor call (RETS) instruction according to an exemplary embodiment of the present invention.

DETAILED DESCRIPTION

In an exemplary embodiment of the present invention, two operations are employed. A first operation is used for calling system routines, and a second operation is used for returning from system routines.

Figure 2:
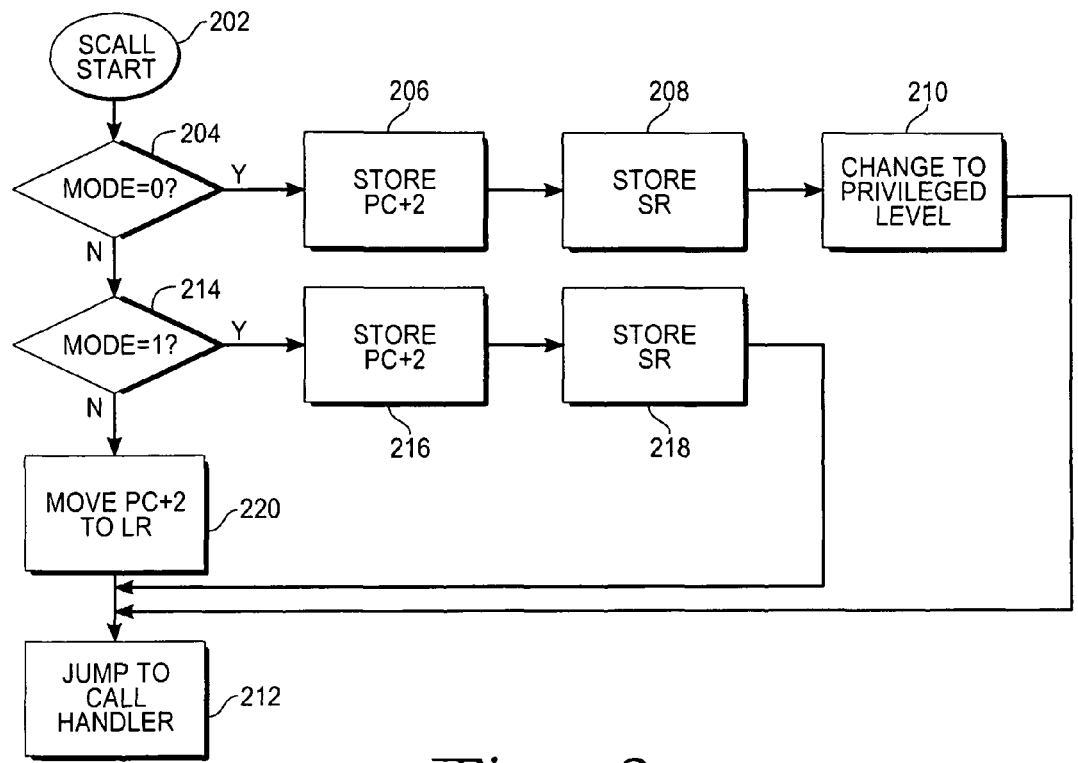
FIG. 2 illustrates a flow chart in connection with a process for executing a supervisor call (SCALL) instruction according to an exemplary embodiment of the present invention.

With reference to FIG. 2, a flowchart for a supervisor call (SCALL) according to an exemplary embodiment of the present invention, SCALL start block 202 initiates a call to a system routine. A first SCALL decision block 204 tests whether the call is being initiated with the system currently operating in mode 0 (i.e., the application mode). If the system is in mode 0, execution progresses to a first store program counter (PC) block 206. Block 206 increments a current program counter value by 2, thereby pointing to a next instruction targeted for execution following the supervisor call (SCALL), and stores the incremented program counter value. Execution progresses to a first store status register (SR) block 208, which stores a current configuration of the status register. Execution progresses to a change to privileged level block 210. Block 210 changes the mode bits from '000' to '001,' placing the system into the supervisor mode. Execution progresses to a jump to call handler block 212. The jump to call handler block 212 executes a jump to an address where the first instruction of the system routine to be executed is located. The execution of the system routine commences.

Redirecting attention to the first SCALL decision block 204: If the current execution mode is not mode 0, execution progresses to the second SCALL decision block 214. The second SCALL decision block 214 tests whether the call is being initiated with the system currently operating in mode 1 (i.e., the supervisor mode). If the system is in mode 1, execution progresses to a second store program counter (PC) block 216. Block 216 increments the current program counter value by 2, thereby pointing to the next instruction targeted for execution following the supervisor call (SCALL), and stores the incremented program counter value. Execution progresses to a second store status register (SR) block 218, which stores a current configuration of the status register. Execution progresses to the jump to call handler block 212.

Redirecting attention to the second SCALL decision block 214: If the current execution mode is not mode 1, execution progresses to the move PC block 220. The move PC block 220 increments the program counter (PC) by 2, thereby pointing to a next instruction targeted for execution following the supervisor call (SCALL), and moves the value into the link register (LR). Execution progresses to the jump to call handler block 212.

Figure 3:
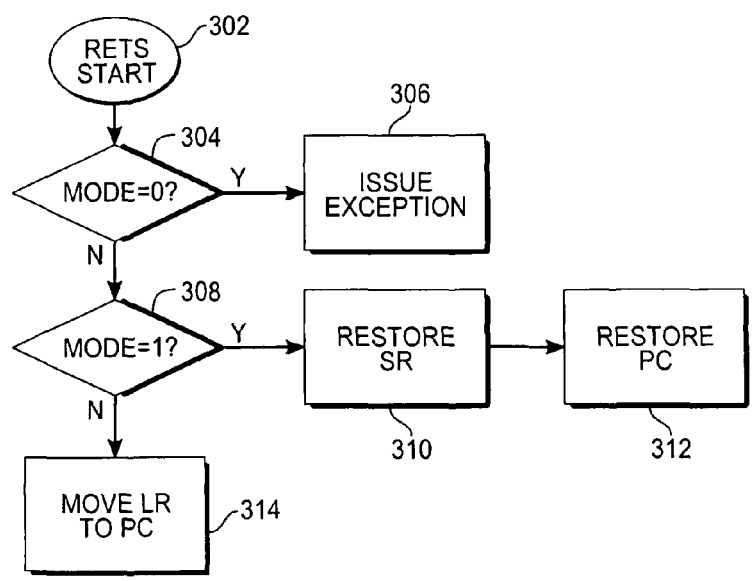
FIG. 3 illustrates a flowchart in connection with a process for executing a return from supervisor call (RETS) instruction according to an exemplary embodiment of the present invention.

The return from the system routine is described in FIG. 3, a flowchart for executing a return from supervisor call (RETS) instruction according to an exemplary embodiment of the present invention, beginning with a RETS start block 302. A first RETS decision block 304 tests whether the return is being initiated with the system currently operating in mode 0 (i.e., the application mode). If the system is in mode 0, execution progresses to an issue exception block 306. The issue exception block 306 issues a privilege violation exception since system calls are required to be executed from a privileged mode.

If the system is not in mode zero, execution progresses to a second RETS decision block 308, which tests whether the system is currently in mode 1 (i.e., the supervisor mode). If the system is in mode 1, execution progresses to a restore status register (SR) block 310, which restores the status register value preserved during the supervisor call (SCALL) by one of the first store status register (SR) blocks, block 208 (FIG. 2) and the second store status register (SR) block 218 (FIG. 2). Execution progresses to a restore program counter (PC) block 312 which moves an address stored by one of the first store program counter (PC) block 206 (FIG. 2) and the second store program counter (PC) block 216 into the program counter (PC). In the exemplary embodiment of the present invention as implemented on the AVR32 32-bit RISC processor core, the action of writing an address to the program counter (PC), causes the program counter (PC) to jump to the address written.

Attention is redirected to the second RETS decision block 308: If the mode is not equal to 1, execution progresses to a move LR block 314 which moves a current value stored in the link register (LR) into the program counter (PC). As explained supra, this will cause the program counter to jump to the new address.

Code Example

An exemplary operation of the present invention can be further understood with reference to a code example for a write( ) system call and library implementation of the exemplary embodiment as implemented on the Atmel® AVR32 32-bit RISC processor core. The resulting binary code can be run from any context. The example comprises an application to write the text "Hello World" to a default output, followed by termination:

```
int main(int argc, char *argv[ ])
{
    char message[ ] = "Hello World\n";
    write(1, message, sizeof(message));
    return 0;
}
```

Skilled artisans will recognize that the application supra is syntactically related to the C programming language. They will further appreciate that the write command comprises a library implementation which is serviced by the operating system.

The write command library implementation passes control to the operating system. In the exemplary embodiment, an assembly language construction for the write command library implementation comprises:

```
.global write
write:
    st.w --sp, lr        ; Push link register
    mov r8, __NR_write   ; Select the write system call
    scall                ; Perform the system call
    ld.w pc, sp++        ; Pop link reg. into program
counter
```

In the assembly language construction supra, comments follow the ";" character. The statement ".global write" identifies a globally accessible procedure, that is, a procedure that is accessible from any other routine. The statement "write:" is a label which provides an address for the routine. The store word instruction, st.w, moves a value contained in a link register (lr) onto a stack with a pre-decrement of the stack pointer (--sp), producing a stack "push." The mov instruction moves a constant _NR_write into a register r8. The value stored in the register r8 instructs the system to perform a write operation when the system call (SCALL) is invoked by the scall instruction following the mov instruction. A load word instruction, ld.w, moves a value from the stack into the program counter (PC) with a post-increment of the stack pointer (sp++), producing a stack "pop." The address in the pc (Program Counter) is executed upon return from the system call (SCALL) instruction in order to return to main( ).

The scall instruction in the assembly language construction supra executes the steps detailed in FIG. 2, the flowchart for a supervisor call (SCALL). Control is transferred when the scall instruction is executed according to a second assembly language construction:

```
syscall_entry:
    pushm r0-r3, r4-r7       ; Push registers to the stack
    cp r8, __NR_write        ; Test if a write system call
    brne not_write           ; If not do something else
    /*
     * Perform the actual write operation. This normally
     * involves writing to a real I/O device and must be
     * performed in a privileged mode.
     */
    popm r0-r3, r4-r7        ; Pop registers from the stack
    rets                     ; Return to caller context
not_write:
    /* Do something else */
```

The statement "syscall_entry:" is a label which provides an address for the supervisor call (SCALL) routine. In the exemplary embodiment of the present invention, the address of the "syscall entry" is located at EVBA+0x100, where EVBA is an exception vector base address (to be explained in additional detail, infra). The pushm instruction pushes multiple registers to the stack, storing the registers specified by the instruction into consecutive words pointed to by a stack pointer (SP); in the example supra, registers r0-r3 and r4-r7 are pushed onto the stack.

The cp instruction compares a value stored in a register r8 with a constant _NR_write. If there is not a match, the brne instruction executes a branch not equal to the routine not_write. The statement "not_write:" is a label which provides an address for a routine to be executed. In the example supra, code for the "not_write" routine is not shown to avoid obscuring the present invention. Instead, a placeholder for the code is indicated in a manner known to skilled artisans by a series of comments beginning with the character sequence "/*" and terminating with the character sequence "*/."

If the value stored in the register r8 matches the constant _NR_write, the program flow progresses to code for performing the requested write operation. In the example supra, the code for performing the write operation is not shown to avoid obscuring the present invention and is instead represented by a series of comments.

At the conclusion of the requested write operation, the popm instruction pops multiple registers from the stack, loading consecutive registers pointed to by the stack pointer (SP) into the registers specified by the instruction. The rets instruction executes a return from supervisor call according to the steps detailed in FIG. 3, the flowchart for executing a return from supervisor call (RETS).

Instruction Detail

An operation of an exemplary embodiment of the present invention will be further presented with reference to FIG. 4, a code sequence for a supervisor call (SCALL) instruction for the Atmel® AVR32 32-bit RISC processor, comprising instructions numbers 401 through 412. Instruction 401 tests bits 0 through 2 of a status register (SR) to determine a current execution mode. A bit value of '000' corresponds to an application mode. A bit value of '001' corresponds to a supervisor mode. If the mode does not match either of '000' and '001,' instructions 411 and 412 (to be explained infra) are executed.

If the mode is one of either '000' and '001,' execution progresses to instruction 402, which tests whether the system has an AVR32A microarchitecture. If the system has the AVR32A microarchitecture, instructions 403 through 406 (to be explained infra) are executed. If the system does not have the AVR32A microarchitecture, instructions 407 through 410 (to be explained infra) are executed.

Instruction 403 increments the program counter (PC) and stores the value on the system stack. The construct "*(--$SP_{SYS}$)" indicates a pointer referencing the top of the system stack with a pre-decrement of the pointer to execute a push. Instruction 404 stores the current value in the system status register (SR) on the system stack. An exception vector base address (EVBA) register contains a pointer to exception routines used by the system. All exception routines start at the EVBA address, or at a defined offset relative to the address. Instruction 405 adds a hexadecimal value of 0x100 to the EVBA, providing an address of the start of the scall handler, and moves the resulting address value into the program counter (PC). Instruction 406 sets the value of the status register (SR) to '001,' placing the system execution into the privileged supervisor mode.

Instruction 407 increments the program counter (PC) and stores the result in a return address register for supervisor context ($RAR_{SUP}$). Instruction 408 moves the contents of the status register (SR) into a return status register for supervisor context ($RSR_{SUP}$). Instruction 409 adds a hexadecimal value of 0x100 to the EVBA, providing the address of the start of the scall handler, and moves the resulting address value into the program counter (PC). Instruction 410 sets the value of the status register (SR) to '001,' placing the system execution into a privileged supervisor mode.

If the mode as tested by instruction 401 does not match either of '000' and '001,' instruction 411 is executed; no mode change is performed as the system is already in a privileged mode. Instruction 411 increments the program counter and stores the result in the link register (LR) which is associated with the current context (represented as $LR_{Current\ Context}$). In an exemplary embodiment of the present invention, a general purpose register R14 is used as a link register (LR) in all modes. The link register (LR) holds subroutine return addresses. When a subroutine call is performed by a variant of a call instruction, LR is set to hold the subroutine return address. A subroutine return is performed by copying the link register (LR) contents back to the program counter. Instruction 412 adds a hexadecimal value of 0x100 to the EVBA, providing the address of the start of the scall handler, and moves the resulting address value into the program counter (PC).

Attention is now directed to FIG. 5, a code sequence for a supervisor return (RETS) instruction used in association with the Atmel® AVR32 32-bit RISC processor call, comprising instruction numbers 501 through 507. Instruction 501 tests bits 0 through 2 of the status register (SR) to determine the current execution mode. If the mode matches '000,' the system is in an application mode and is attempting a supervisor call return, resulting in an error condition. If the mode matches '001,' the system is in the supervisor mode and control passes to the sequence comprising instructions 502 through 507.

Instruction 502 tests whether the system has the AVR32A microarchitecture. If the system has the AVR32A microarchitecture, instructions 503 and 504 (to be explained infra) are executed. If the system does not have the AVR32A microarchitecture, instructions 505 and 506 (to be explained infra) are executed.

Instruction 503 moves the value on the top of the system stack to the status register (SR). The construct "*($SP_{SYS}$++)" indicates a pointer referencing the top of the system stack with a post-increment of the pointer to execute a pop. Instruction 504 moves the value on the top of the system stack to the program counter (PC).

Instruction 505 moves the value stored in the return status register for supervisor context ($RSR_{SUP}$) into the status register (SR). Instruction 506 moves the address stored in the return address register for supervisor context ($RAR_{SUP}$) into the program counter (PC).

If the mode tested in instruction 501 does not match either of '000' and '001,' control passes to instruction 507. Instruction 507 moves the address stored in the link register (LR) which is associated with the current context (represented as $LR_{current\ Context}$) into the program counter (PC), and program execution continues.

In the foregoing specification, the invention has been described with reference to specific embodiments thereof. It will, however, be evident to a skilled artisan that various modifications and changes can be made thereto without departing from the broader spirit and scope of the invention as set forth in the appended claims. For example, skilled artisans will appreciate that although the methods have been presented with reference to the AVR32 32-bit RISC processor core, the methods are applicable to a variety of microprocessors and microcontrollers, including load/store architectures (popularly called RISC machines) and memory-oriented architectures (traditionally called CISC machines). The specification and drawings are, accordingly, to be regarded in an illustrative rather than a restrictive sense.

What is claimed is:

1. A computer-implemented method comprising:
   receiving a call to a system routine made from any of a plurality of operation modes configured to execute within a given instruction set architecture, the plurality of operation modes including an unprivileged application mode and a privileged supervisor mode, the unprivileged application mode initiating the call from an application program configured to execute in the given instruction set architecture and the privileged supervisor mode initiating the call from an operating system configured to execute in the given instruction set architecture, the method further comprising the following steps in the following order:
   determining an execution context of the operation mode from which the call was made;
   if the execution context includes the unprivileged application mode, then:
       incrementing a program counter value;
       storing the program counter value in a system stack, wherein the program counter value includes an address of an instruction in the given instruction set to be executed upon completion of the system routine;
       storing context information on the system stack;
       changing the execution context to a privileged context; and
       jumping to a predefined address where a system call handler is located;
   if the execution context is a privileged supervisor mode, then:

incrementing the program counter value;
storing the program counter value in a system stack, wherein the program counter value includes an address of an instruction to be executed upon completion of the system routine;
storing context information on the system stack; and
jumping to the predefined address where the system call handler is located; and if the execution context is any of a plurality of other privileged modes, then:
incrementing the program counter value;
moving the program counter value into a link register, wherein the program counter value includes an address of an instruction to be executed upon completion of the system routine; and
jumping to the predefined address where the system call handler is located.

2. The computer-implemented method of claim 1, comprising:
receiving a return call from the call to the system routine made from any of a plurality of execution modes within a given instruction set architecture, the plurality of execution modes including an application mode and a supervisor mode, the application mode initiating the call to the system routine from an application program configured to execute in the given instruction set architecture and the supervisor mode initiating the call to the system routine from an operating system configured to execute in the given instruction set architecture;
determining an execution mode from which the return call was initiated;
if the execution mode is an unprivileged application mode, then issuing an exception;
if the execution mode is a privileged supervisor mode, then:
restoring the context information; and
restoring the program counter value; and
if the execution mode is any of a plurality of other privileged modes, then moving the value contained in the link register into the program counter.

3. The method of claim 1, wherein receiving a call includes initiating the call using a supervisory call (SCALL) instruction.

4. The method of claim 2, wherein receiving a return call includes initiating the return call using a supervisor return (RETS) instruction.

5. The method of claim 1, wherein receiving a call to a system routine includes receiving a call to a system routine made from any of a plurality of operation modes configured to execute within a load/store architecture.

6. The method of claim 1, wherein receiving a call to a system routine includes receiving a call to a system routine made from any of a plurality of operation modes configured to execute within a memory oriented architecture.

* * * * *

UNITED STATES PATENT AND TRADEMARK OFFICE
CERTIFICATE OF CORRECTION

PATENT NO. : 7,996,659 B2
APPLICATION NO. : 11/145613
DATED : August 9, 2011
INVENTOR(S) : Erik K. Renno et al.

It is certified that error appears in the above-identified patent and that said Letters Patent is hereby corrected as shown below:

Column 8, line 22, delete "$LR_{current\ Context}$" and insert -- $LR_{Current\ Context}$ --

Signed and Sealed this
Fourth Day of October, 2011

David J. Kappos
*Director of the United States Patent and Trademark Office*